Sept. 29, 1953     E. R. LANGDON     2,653,547
HYDRODYNAMIC COUPLING
Filed March 1, 1947
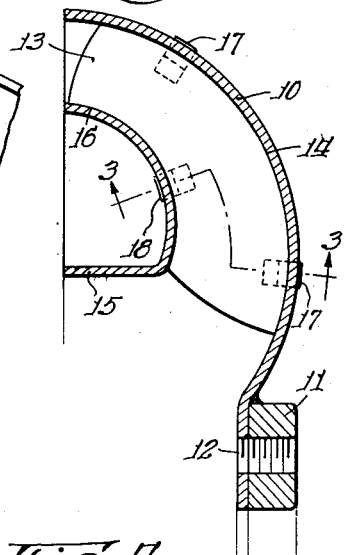
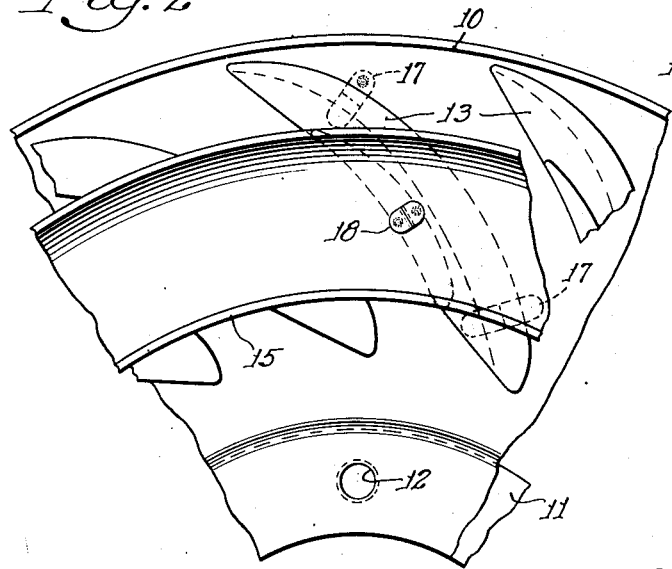
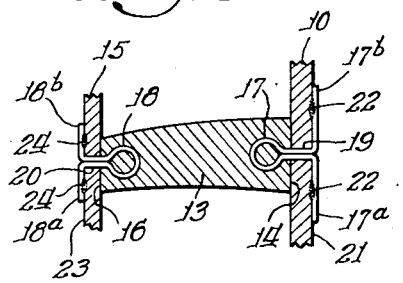
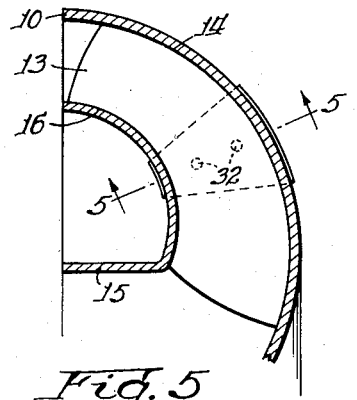
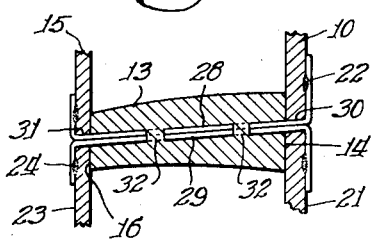
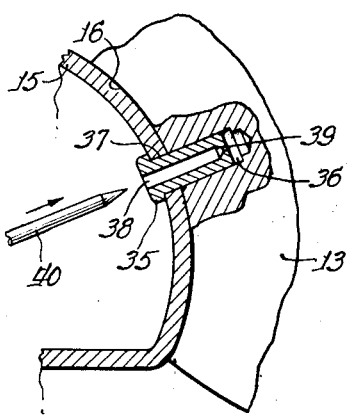
Inventor:
Eric R. Langdon Patented Sept. 29, 1953

2,653,547

UNITED STATES PATENT OFFICE 2,653,547

HYDRODYNAMIC COUPLING

Eric R. Langdon, Muncie, Ind., assignor to Borg-Warner Corporation, Chicago, Ill., a corporation of Illinois Application March 1, 1947, Serial No. 731,739

5 Claims. (Cl. 103—115)

My invention relates to hydrodynamic coupling devices and more particularly to such coupling devices which function to multiply the torque between an input and an output shaft.

Hydrodynamic coupling devices generally comprise a plurality of vaned elements including a driving element and a driven element, the drive between which is through a body of liquid. The vanes of these elements impart energy to and receive energy from the body of liquid. A fluid coupling which is not intended to multiply torque generally includes only two vaned elements while a hydrodynamic torque converter includes at least three vaned elements, a stator element which has a reaction force impressed thereon by the fluid and is held from rotation being the third element. Such hydrodynamic torque converters are shown, for example, in Schneider et al., Patent No. 2,306,758, and Schneider et al., Patent No. 2,333,680.

Considerable difficulty has been experienced in the past in assembling the hydrodynamic coupling vaned elements and in particular, those for coupling devices of the torque converter type. The vanes in the driving and driven elements of the non-torque converting type of coupling are generally flat pieces of metal which are relatively simple to attach to the driving and driven members; however, the vanes in the elements of a torque converting hydrodynamic device, on the other hand, generally are curved and are of substantial thickness and differ in thickness throughout their length and breadth. It has been found that the vanes of a torque converting hydrodynamic device may be made expeditiously by casting; however, this type of vane has proved quite difficult to attach to the driving, driven or stator elements of the torque converter. This is particularly true when the vanes are of a metal such as aluminum which cannot be welded very well to these elements; which are preferably steel stampings.

It is an object of my invention to provide an improved arrangement for attaching the vanes to the casing of a vaned hydrodynamic element in order to form the element, which vanes have substantial thickness and are contemplated to preferably be of a light weight metal, which cannot be readily welded to the casing.

More particularly, it is an object of my invention to provide each of the vanes in a hydrodynamic torque converter with deformable members extending outwardly from the edges of the vane and through openings in the casing of the torque converter and which are deformed to fasten the vanes and casing together.

It is a more specific object of the invention to provide aluminum vanes in a hydrodynamic torque converter with steel inserts, which extend from the edges of the vanes and through openings in the casing of the converter and which are clinched over on faces of the casing in order to fasten the vanes and casing together. It is contemplated that the steel inserts may preferably be cast in the vanes and may extend completely through the vanes from one edge to the other or may constitute a pair of separate inserts adjacent opposite edges of the vanes.

It is still another object of the invention to provide a deformable rivet arrangement for fastening the vanes to a casing member in a hydrodynamic torque converter. It is contemplated that the vanes shall be put in place relative to the casing member and then the deformable rivets may be positioned in coinciding openings preliminarily formed in the casing and vanes, and thereafter deformed in order to fix the parts together.

The invention consists of the novel constructions, arrangements, and devices to be hereinafter described and claimed for carrying out the above stated objects and such other objects as will appear from the following description of certain preferred embodiments illustrated with reference to the accompanying drawing, wherein:

Fig. 1 is a cross-sectional view of a portion of an impeller or driving element of a hydrodynamic torque converter illustrating one embodiment of the invention;

Fig. 2 is an elevational view of the impeller as seen from the left in Fig. 1 or from the inner side of the impeller;

Fig. 3 is a cross-sectional view on an enlarged scale of the impeller shown in Figs. 1 and 2 and taken on the line 3—3 in Fig. 1 in the direction indicated;

Fig. 4 is a cross-sectional view of a portion of an impeller illustrating another embodiment of the invention;

Fig. 5 is a sectional view on an enlarged scale of the impeller shown in Fig. 4 and taken on the line 5—5 in Fig. 4 in the direction indicated; and Fig. 6 is a cross-sectional view of a portion of an impeller illustrating another embodiment of the invention.

Like characters of reference designate like parts in the several views.

Referring now to the drawings, the illustrated impeller element may be seen to comprise an outer casing 10 which is provided with a hub portion 11 welded thereto. Suitable holes 12 are provided in the hub portion and casing by means of which the impeller element may be attached to a suitable hub (not shown). The casing 10 has a plurality of vanes 13 disposed in equally spaced relation therein, and the vanes are in contact with the casing 10 on base edges 14 thereof. An inner core or core ring 15 is disposed within and spaced from the casing 10, and the core is in contact with edges 16 of the vanes which are opposite the vane edges 14.

It will be understood that the casing 10 and the core 15 are both annular and are complete rings, although only portions of the casing and core are illustrated in the drawing. The vanes 13 are equally spaced and extend completely around the casing and core ring. It will be noted that the vanes 13 are curved and have a varying and substantial thickness, and the vanes are of such form that the illustrated hydrodynamic coupling element is adapted to constitute an impeller or driving element in a hydrodynamic torque converter, such as is, for example, shown in the two Schneider patents hereinbefore mentioned. It will be understood that the illustrated impeller element is adapted to be used in connection with a vaned driven element and a vaned stator element, which constitute the three elements ordinarily found in a hydrodynamic torque converter, with the impeller element functioning to impart energy to a body of liquid in the torque converter, the driven or runner element receiving energy from the liquid and the stator element being held from rotation and functioning as a reaction element to change the direction of flow of liquid so that the coupling functions to multiply the torque.

The casing 10 and core ring 15 are preferably steel stampings, and in view of the fact that these two parts need not have any substantial thickness, they may be made as light as desired. It will be understood, of course, that the casing and core ring may also be made of other suitable materials, such as cast iron which is turned down on a lathe to suitable shape and thickness. The vanes 13, which have substantial thickness and which would have appreciable weight if made from steel, are preferably cast of a lighter material, such as aluminum, or, as will be understood, the vanes may even be made of a light non-metallic material such as a synthetic resin. The vanes 13, the core ring 15 and the casing 10 are fixed together, and an obvious way of so fixing these parts together would, of course, simply constitute welding the parts together. In actual practice, however, it has been found difficult to satisfactorily weld aluminum vanes to a steel casing and core ring, due to the difference of the two metals. My invention solves this problem by providing deformable members which extend through the casing or core ring and into the vanes which, after being deformed, function to fix these parts together.

A pair of steel pins or inserts 17 are provided on the outer edge 14 of each of the vanes 13, and a steel pin or insert 18 is provided in the inner edge 16 of each of the vanes. The inserts 17 and 18 in cross section are in the form of cotter pins, as will be noted from Fig. 3, but the inserts have greater width than ordinary cotter pins as will be noted from Figs. 1 and 2, the inserts being formed from flat sheet metal stock as by stamping. The inner ends of these inserts are suitably positioned in a mold for the vanes and when the vanes as a whole are cast the inserts are thus embedded in the vanes. Openings 19 are provided in the outer casing 10 and openings 20 are provided in the core 15 for receiving the pins 17 and 18 when the vanes 13 are positioned in their proper places in the casing 10 and with respect to the core ring 15.

The pins 17 are clinched over the casing 10 and have their outer ends 17a and 17b bent back into contact with the outer face 21 of the casing 10 in order to fix the vanes 13 with respect to the outer casing. The pin portions 17a and 17b may also be spot welded, as at 22, to the face 21 for further fixing the vanes with respect to the outer casing 10. The core ring 15 is fixed in a similar manner with respect to the vanes 13 by a deformation of the pins 18. The ends 18a and 18b of the pins are bent back into contact with the outer face 23 of the core ring 15 to clinch the pins over the core ring, and the pin ends 18a and 18b are also preferably welded as at 24 to the face 23.

The pins 17 and 18 thus function to satisfactorily fix the aluminum vanes 13 with respect to the steel casing 10 and steel core ring 15. The pins 17 and 18 fix the parts together by being clinched over the casing 10 and core ring 15 respectively and also preferably by being welded to these two parts. Since the pins 17 and 18 are of steel, the welds at 22 and 24 are easily made. It is, of course, contemplated that the pins 17 and 18 may be of materials other than steel, but if welded to the casings 10 and 15, they should be of material easily welded to the material of the casings.

The impeller element may be made by, first stamping out the casing 10 and core ring 15 and providing these two members with the holes 19 and 20 therein. The vanes 13 are cast with the pins 17 and 18 imbedded therein so as to project from the edges 14 and 16 respectively of the vanes. The parts are assembled by placing the vanes 13 in the casing 10 with the pins 17 extending through the openings 19. The core ring 15 is then put in place on the edges 16 of the vanes 13 with the pins 18 extending through the holes 20. The pins 17 and 18 are then clinched over to bring the ends of the pins 17a and 17b into contact with the face 21 of the casing 10 and to bring the pin ends 18a and 18b into contact with the face 23 of the core ring 15. The pin ends 17a and 17b are then spot welded to the surface 21 of the casing 10 and the pin ends 18a and 18b are spot welded to the surface 23 of the core ring 15.

The embodiment of the invention illustrated in Figs. 4 and 5 is quite similar to that shown in Figs. 1, 2 and 3, the essential difference being that inserts or pins 28 and 29 preferably of steel extending completely through the vanes 13 which may be of aluminum are provided in lieu of the pins 17 and 18. A single pair of inserts 28 and 29 are provided for each of the vanes 13 and extend outwardly from the faces 14 and 16 of the vanes 13 similar to the pins 17 and 18. As will be noted from Fig. 4 the inserts 28 and 29 are considerably wider at their ends at the vane edges 14 than at the other vane edges, and therefore, one set of inserts 28 and 29 is sufficient for each vane. Elongated openings 30 and 31 are provided respectively in the casing 10 and core ring 15 through which the inserts 28 and 29 project in order to properly position the parts together. The inserts are split and clinched over on the faces 21 and 23 and, like the cotter pins 17 and 18, are preferably welded at 22 and 24 to these faces for fixing the parts together. The inserts 28 and 29 are provided with intermediate holes 32 for fixing the inserts within the vanes 13, as shown.

The impeller, shown in Fig. 4, may be assembled similarly to that shown in Figs. 1, 2 and 3. The casing 10 and inner core 15 are first stamped out of sheet metal and the elongated openings 30 and 31 are provided therein. The vanes 13 are cast with the inserts 28 and 29 imbedded therein, and then the casing 10, core ring 15 and vanes 13 are positioned relative to each other and are fixed together in the same manner as are the corresponding parts in the first embodiment of the invention.

In the embodiment of the invention illustrated in Fig. 6, a vane 13 is shown fixed to a core ring 15 (and it will be understood that the vanes 13 may be similarly fixed with respect to an outer casing 10) by means of an expansion rivet 35. The vane 13 is provided with a hole 36 opening on its edge 16, and the core ring 15 is provided with an opening 37, both of which are adapted to receive the expansion rivet 35. The rivet has a central cavity 38 therein bottomed by a constricted portion 39 as shown. The constricted portion 39 is deformed in order to grip the sides of the hole 36 in the vane 13 for fixing the core ring and vane together. It will be understood that other vanes (not shown) are similarly fixed to the core ring 15.

This embodiment is assembled by placing the vanes 13 in their proper positions with the holes 36 in alignment with the openings 37. The rivets 35 are then put into place, and the inner constricted portion 39 of each of these rivets is deformed in order to form a tight union between the inner ends of the rivets and the sides of the holes 36 in the vanes 13. The inner end of each of the rivets may be so deformed by means of a punch 40 which is inserted into the central cavity 38 in the expansion rivet and is driven into the constricted portion 39 at the bottom end of the rivet.

I wish it to be understood that my invention is not to be limited to the specific constructions of hydrodynamic couplings which are shown and described, except only insofar as the claims may be so limited, as it will be apparent to those skilled in the art that changes may be made without departing from the principles of the invention. In particular, I wish it to be understood that the invention is not to be limited to torque converting couplings to the exclusion of non-torque converting couplings, unless the claims are so limited. Furthermore, I wish it to be understood that although the embodiments of the invention illustrated are in connection with an impeller element, the invention is not to be limited to an impeller element to the exclusion of driven and stator elements in a hydrodynamic coupling, unless the claims are so limited. Also, I wish it to be understood that although the vanes 13 are described as being made of aluminum and the outer casing 10 and core ring 15 of steel, it is within the scope of this invention, as defined by the claims, to make these parts of any suitable materials, unless the claims are so limited.

I claim:

1. In a vaned element of a hydrodynamic coupling device, the combination of a hollow casing member, a plurality of vanes of substantial thickness fitting in said casing member, said casing member being formed of thin sheet ferrous metal and said vanes being formed of cast non-ferrous material, a deformable steel member formed of flat sheet metal stock, said deformable member being reversed upon itself to provide a head portion and a pair of parallel extending portions, said head portion and parallel extending portions being imbedded in each of said vanes and the latter portions projecting beyond the confines of said vane and extending through said casing member and being bent laterally in opposite directions so as to lie substantially flush with the outer faces of said casing member.

2. In a vaned element of a hydrodynamic coupling device, the combination of a hollow casing member, a plurality of vanes of substantial thickness fitting in said casing member, said casing member being formed of thin sheet ferrous metal and said vanes being formed of cast non-ferrous material, a deformable steel member formed of flat sheet metal stock, said deformable member being reversed upon itself to provide a head portion and a pair of parallel extending portions, said head portion and parallel extending portions being imbedded in each of said vanes and the latter portions projecting beyond the confines of said vane and extending through said casing member and being bent laterally in opposite directions so as to lie substantially flush with the outer faces of said casing member, and being welded to said faces.

3. In a vaned element of a hydrodynamic coupling device, the combination of a hollow casing member, a plurality of vanes of substantial thickness fitting in said casing member, said casing member being formed of thin sheet ferrous metal and said vanes being formed of a cast aluminum, a steel attachment member having the general shape of a conventional cotter pin and having flat sides, the head portion of said attachment member and a part of the shank portion thereof being imbedded in each of said vanes, the remainder of the shank part thereof projecting beyond the confines of said vanes and extending through said casing member, the projecting ends of said attachment member being spread laterally and brought into face-to-face contact with the outer surface of said casing member to bind said vane to said casing member in fixed relationship.

4. In a vaned element of a hydrodynamic coupling device, the combination of a hollow casing member, a plurality of vanes of substantial thickness fitting in said casing member, said casing member being formed of thin sheet ferrous metal and said vanes being formed of cast aluminum material, a steel attachment member having the general shape of a conventional cotter pin and having flat sides, the head portion of said attachment member and a portion of the shank part thereof being imbedded in each of said vanes the remainder of the shank part thereof projecting beyond the confines of said vanes and extending through said casing member, the projecting ends of said attachment member being spread laterally and brought into face-to-face contact with the outer surface of said casing member to bind said vane to said casing member in fixed relationship, and being welded to said outer face.

5. In a vaned element of a hydrodynamic coupling device, the combination of a hollow casing member, a plurality of streamlined vanes fitting in said casing member, a core fitting on said vanes in spaced relationship to the casing member, said core and casing member being of sheet steel and said vanes being of cast aluminum, and a pair of deformable members formed of flat sheet steel for each of said vanes and each being reversed upon itself to form a substantially cylindrical shaped head with a pair of parallel extending portions in face-to-face relationship, said vanes being substantially solid and having a sufficient thickness to completely imbed the heads of said deformable members to thereby secure the deformable members in the vanes, the parallel extending portions of one of each pair of said deformable members projecting from one edge of each of said vanes and extending through said core, the parallel extending portions of the other of each pair of said deformable members projecting from the other edge of each of said vanes and extending through said casing member, the ends of said parallel extending portions each extending through said casing member and core and being bent divergingly and at substantially right angles so as to lie substantially flush with the outer faces of the casing member and core and being welded thereto.

ERIC R. LANGDON.

References Cited in the file of this patent

UNITED STATES PATENTS

| Number | Name | Date |
| --- | --- | --- |
| 577,737 | Flaherty | Feb. 23, 1897 |
| 814,804 | Rateau | Mar. 13, 1906 |
| 1,286,283 | Gilson | Dec. 3, 1918 |
| 1,731,445 | Thomann | Oct. 15, 1929 |
| 1,825,622 | Kennedy | Sept. 29, 1931 |
| 1,838,417 | Le May | Dec. 29, 1931 |
| 2,065,154 | Rayniak | Dec. 22, 1936 |
| 2,205,054 | Wemp | June 18, 1940 |
| 2,254,024 | Zaiger | Aug. 26, 1941 |
| 2,297,309 | Limbert | Sept. 29, 1942 |
| 2,302,437 | Frisbie | Nov. 17, 1942 |
| 2,324,011 | Miller | July 13, 1943 |
| 2,332,330 | McMattan | Oct. 19, 1943 |
| 2,345,371 | Amrine | Mar. 28, 1944 |
| 2,357,628 | Boerger | Sept. 5, 1944 |
| 2,371,588 | Salerni | Mar. 13, 1945 |
| 2,494,539 | Bolender | Jan. 17, 1950 |